(12) United States Patent
Krug et al.

(10) Patent No.: US 7,894,418 B2
(45) Date of Patent: Feb. 22, 2011

(54) MIXED ANALOG AND DIGITAL CHIP-SCALE RECONFIGURABLE WDM NETWORK

(75) Inventors: William P. Krug, Bellevue, WA (US); Harold Hager, Bellevue, WA (US); Michael C. Hamilton, Redmond, WA (US); Axel Scherer, Laguna Beach, CA (US)

(73) Assignee: The Boeing Company, Chicago, IL (US)

( * ) Notice: Subject to any disclaimer, the term of this patent is extended or adjusted under 35 U.S.C. 154(b) by 2210 days.

(21) Appl. No.: 10/641,334

(22) Filed: Aug. 13, 2003

(65) Prior Publication Data

US 2004/0114930 A1 Jun. 17, 2004

Related U.S. Application Data

(60) Provisional application No. 60/404,073, filed on Aug. 15, 2002.

(51) Int. Cl.
*H04B 10/00* (2006.01)
*G02B 6/26* (2006.01)

(52) U.S. Cl. .................. 370/351; 370/907; 385/32; 385/39

(58) Field of Classification Search .................. 385/15, 385/16–24, 27, 37, 39, 32
See application file for complete search history.

(56) References Cited

U.S. PATENT DOCUMENTS

| | | | | |
|---|---|---|---|---|
| 5,289,550 A * | 2/1994 | Plastow | ............................ | 385/9 |
| 5,815,296 A * | 9/1998 | Kubota | ............................ | 398/91 |
| 5,926,496 A | 7/1999 | Ho et al. | | |
| 6,195,187 B1 | 2/2001 | Soref et al. | | |
| 6,208,440 B1 * | 3/2001 | Jang | ............................ | 398/9 |
| 6,226,111 B1 * | 5/2001 | Chang et al. | ............................ | 398/9 |
| 6,333,799 B1 * | 12/2001 | Bala et al. | ............................ | 398/9 |
| 6,498,871 B1 * | 12/2002 | Kuboki | ............................ | 385/24 |
| 6,728,028 B1 * | 4/2004 | Rodriguez et al. | ............................ | 359/341.32 |
| 6,891,993 B2 * | 5/2005 | Prather et al. | ............................ | 385/24 |
| 6,928,091 B1 * | 8/2005 | Maleki et al. | ............................ | 372/20 |
| 7,167,483 B1 * | 1/2007 | Sharma et al. | ............................ | 370/442 |
| 2002/0076182 A1 * | 6/2002 | Terahara et al. | ............................ | 385/122 |
| 2003/0142320 A1 * | 7/2003 | Mells | ............................ | 356/484 |
| 2004/0012452 A1 * | 1/2004 | Young et al. | ............................ | 331/135 |

(Continued)

FOREIGN PATENT DOCUMENTS

EP   1 122 905 A2   8/2001

(Continued)

OTHER PUBLICATIONS

Gates et al.; Hybrid Integrated Silicon Optical Bench Planar Lightguide Circuits; 1998 Electronic Components and Technology Conference; May 25, 1998; pp. 551-559, New York, NY.

(Continued)

*Primary Examiner*—William Trost, IV
*Assistant Examiner*—Roberta A Shand (57) ABSTRACT

The present invention provides a mixed analog and digital chip-scale reconfigurable WDM network. The network suitably includes a router that enables rapidly configurable wavelength selective routers of fiber optic data. The router suitably incorporates photonic wavelength selective optical add/drop filters and multiplexers.

18 Claims, 6 Drawing Sheets

U.S. PATENT DOCUMENTS

2004/0013355 A1* 1/2004 Margalit ............... 385/27
2005/0157991 A1* 7/2005 Terahara et al. ......... 385/100

FOREIGN PATENT DOCUMENTS

| JP | 2001318247 | 11/2001 |
| --- | --- | --- |
| WO | 0049752 | 8/2000 |
| WO | WO 00/49752 | 8/2000 |
| WO | WO 01/22141 A1 | 3/2001 |
| WO | WO 02/11489 A2 | 2/2002 |
| WO | WO 03/007440 | 1/2003 |

OTHER PUBLICATIONS

Boussey et al.; Optoelectronic Integration in Silicon-On-Insulator Technologies; Semiconductor Conference 1998; Oct. 6, 1998; pp. 407-415; New York, NY.

Baack, Entwicklungstendenzen Photonischer Nachrichtennetze. Trends of Photonic Communications Network; Sep. 1, 1996; pp. 192-197, vol. 50, No. 9/10; Berlin, DE.

Kosaka et al.; Superprism Phenomena in Photonic Crystals; American Institute of Physics; Oct. 15, 1998; pp. R10096-R10099; vol. 58, No. 16; Japan.

MICROMAGAZINE.COM, Holy Grail! Motorola claims high-yield GaAs breakthrough, Oct. 1, 2001, pp. 1-3.

Gates et al., "Hybrid Integrated Silicon Optical Bench Planar Lightguide Circuits," IEEE 1998 Electronic Components and Technology Conference (May 1998).

Yoshino et al., "Temperature tuning of stop band in transmission spectra liquid crystal infiltrated synthetic opal as tunable photonic crystal," Applied Physics Letters, vol. 75, No. 7 (Aug. 1999), April.

Chen et al., Polymer-based optical waveguide devices speed connections (Aug. 2000).

Scherer et al., "InGaAsP Photonic band gap crystal membrane microresonators," J.Vac.Sci.Technol. B 16(6), (May 1998).

* cited by examiner

MIXED ANALOG AND DIGITAL CHIP-SCALE RECONFIGURABLE WDM NETWORK

PRIORITY CLAIM

This application claims priority from the U.S. provisional patent application Ser. No. 60/404,073 entitled "Mixed Analog And Digital Chip-Scale Reconfigurable WDM Network" and filed on Aug. 15, 2002, contents of which are incorporated by this reference.

FIELD OF THE INVENTION

This invention relates generally to fiber optic communication and, more specifically, to routing optic signals on a fiber optic network.

BACKGROUND OF THE INVENTION

Most information systems, such as personal computers and automotive controlling computers, rely upon a copper wire based network to carry signals to remote components. In many ways, this has proven to be an impediment to the speed of the system. At the center of a computer, for instance, a Pentium 4 central processor might operate at 2.4 GHz, but data travels on a central bus on a circuit board at a mere 400 MHz, while output devices might only receive their instructions at 133 MHz.

One approach is to push the wire to its theoretical limits. Physical dimensions, such as length and diameter, and the parasitic resistance, capacitance, and impedance resulting from the dimensions, however, define a wire. At low frequencies or bit rates, the series resistance and shunt capacitance of the wire (or circuit board trace) dominate its behavior. The rise or fall time limits the data rate. As the designer chooses to push the frequency higher, the wire's own impedance becomes the dominant factor, acting much as transmission lines to attenuate and reflect signals based upon the characteristic impedance of the lines. The fastest processor ends up waiting for the wires.

In high performance communication systems, photons have supplanted electrons as messengers. Photons travel on fiber optic waveguides from place to place at the speed of light. The photon frees the processor from its copper shackles. The market is just starting to see the several component-based optical networks capable of transmission rates of 2.5 Gb/sec. Chip-to-chip fiber optic connections could boost the output of a processor by a factor of a thousand.

One natural application for such a fiber optic network is military fighter aircraft. For the last century, the military has sought to integrate the latest technologies into the field of battle as a means of multiplying its strength. A modem fighter aircraft is effective because of the amazing array of computers, sensors, triggers, and displays onboard. The fighter is not only an airplane but it is also a combatant's instrument. In that role, it must defend itself, reconnoiter the theater of operations, track targets, jam enemy sensors, and fire its weapons. Because the weapons, themselves, are "smart," the aircraft often must be competent to converse with the weapons in order to charge them with their mission before and during flight.

Not only is the aircraft an array of computers, but also among the array of computers, there exists, on the airframe, a great variety of computers. Some threat computers receive analog input—digitizing would slow reaction to the threat. Some engine sensors send analog information only. An optical network ideally should be able to handle both in order to be fully effective in optimizing the communication within the airframe.

Analog systems differ from digital systems. When transmitted over an optic fiber, analog and digital systems differ greatly in magnitude. All network systems have ambient noise. In an analog system, the approach to fidelity over ambient noise is to "shout" over it. Where an analog system has an anticipated range of values, the maximum value is set at a gain value representing the near maximum capacity of the fiber. The minimum value is designated as the first value reliably discemable over the noise. That value then becomes the bias for the analog system allowing fidelity in all information transmitted.

Digital systems have a slightly different approach to noise. Using the same ambient level as a threshold, only the "ones" have to exceed the ambient. The "zeros" can be buried in the noise without ill effect. In some systems where the "zeros" must emerge from the noise for the sake of timing, values for "zero" and "one" are set such that both exceed the noise but still do not approach magnitude of the analog signal. These, too, are "whispers" compared to the analog "shout."

Systems within a fighter airframe are located at discrete places that allow optimal performance of the system. For instance, a wing might hold a variety of sensors: feedback loops for aileron and flap positions, anti-stall sensors, threat assessment antennae, fuel state sensors, and weapons state nodes. The information from each of the sensors must ultimately get to distinct systems on the airframe for processing.

One means of getting the information on the system has been to assign it to discrete optical "channels" according to the intended destination. By convention, the military has decided to designate 32 such channels for both analog and digital signals. The channels are partitioned to each of two common wavelength bands: 1.55 µm for analog signals and 1.3 µm for digital signals. Each of the channels has a rate capacity of approximately 2.5-40 Gb/second. Information senders are assigned to wavelengths according to the receiving system and according to the nature of the output, i.e. digital or analog.

Wavelength division multiplexing (WDM) is the process of carrying light of multiple wavelengths within the fiber. The fiber will carry the several channels without interference. WDM combines multiple optical signals so that they can be amplified as a group and transported over a single fiber to increase capacity. At the receiving end of the fiber, the information carried on the several channels is taken off of the fiber and separated into its several channels and recombined based upon destination.

Such a system presumes the existence of a router capable of sensing the wavelength of a channel carrier (arbitrarily $\lambda_1$) from a WDM transmitter at a source and capable of placing the information from the designated channel onto the correct optic trunk to reach the intended WDM receiver destination in the system. Optical channels are separated and recombined most readily through the phenomena known as refraction and diffraction. Refraction is the deflection from a straight path undergone by a light ray or energy wave in passing obliquely from one medium (such as air) into another (such as glass) in which its velocity is different. Diffraction is a modification that light undergoes in passing by the edges of opaque bodies or through narrow slits or in being reflected from ruled surfaces and in which the rays appear to be deflected and to produce fringes of parallel light and dark or colored bands. In either regard, the light waves are bent according to their wavelength.

Many WDM multiplexers and de-multiplexers in current use, such as arrayed waveguide gratings (AWGs), are complex to fabricate, bulky in size, and relatively costly. The AWG consists of a number of arrayed channel waveguides that act together like a diffraction grating in a spectrometer. The grating offers high wavelength resolution, thus attaining narrow wavelength channel spacings such as 0.8 nm. Other de-multiplexers include traditional dispersive devices, such as diffraction gratings and prisms. While being much simpler and less expensive than AWGs, these devices typically have an angular dispersion less than one degree per nm, which prevents them from being sufficiently compact for most applications. Regardless of the configuration, because of their dependence on geometry, the routers are very sensitive to temperature and generally to shock, thus not well-suited to a military environment.

Superprisms, a much more highly dispersive photonic crystal counterpart to the array waveguide (AWG), have been used to map different wavelengths onto different propagation paths. Superprisms are simpler and much smaller than AWGs, and have very low cross-talk. They are a special type of photonic crystal de-multiplexing structure that provides angular separation by wavelength that is up to 100 times the angular separation of conventional dispersive media.

Photonic crystals are optical materials with an intricate three-dimensional structure that manipulates light in unusual ways thanks to multiple Bragg diffraction in specific directions. The structure has the length scale of the order of the wavelength of light. An example of a photonic crystal is the gem opal, which consists of a regular array of tiny silicate spheres, ordered like the atoms in a crystal lattice, but on a scale a thousand times larger. If the structure has a large enough variation in refractive index for a periodic array of holes or columns in specific directions relative to the symmetry of a crystal lattice, a "photonic bandgap" occurs. Under these special circumstances, Bragg diffraction prevents a certain range of wavelengths from propagating in selected directions inside the crystal. By designing the bandgap appropriately, i.e. by engineering the lattice spacing of the photonic material to be either highly dispersive or to blocks wavelengths (except those wavelengths passed by controlled defects, the resulting crystal will function as a superprism with dispersive properties for a superprism being many times greater than that of optical glass prisms. Such superprisms can be created by the same lithographic technologies that are currently employed for constructing integrated electronic circuitry. Alternately, controlled defects introduced into photonic crystal lattices can lead to wavelength selective resonator filters within the photonic band gap. Currently WDM components occupy a volume or footprint that is too large for emerging military platforms. In addition, the WDM components will only support static network topologies, not allowing for new functions or services. Photonic crystal resonator filter components designed for digital power levels are expected to destructively overheat under the greater power outlay of analog systems. Analog systems require higher signal to noise ratios than is required to discern between the power levels assigned to "zeros" and "ones."

What is needed then, is a WDM router on a chip-scale that overcomes problems with WDM components known in the art.

SUMMARY OF THE INVENTION

The present invention provides a mixed analog and digital chip-scale reconfigurable WDM network. The network suitably includes a router that enables rapidly configurable wavelength selective routers of fiber optic data. The router suitably incorporates photonic wavelength selective optical add/drop filters and multiplexers.

Because of the scale and the programmable nature of the router, it could be economically be substituted as either a multiplexer or de-multiplexer as well, thereby allowing a smaller inventory to service an existing network.

In one exemplary embodiment, mixed analog and digital chip-scale wavelength selective router includes an optical de-multiplexer associated with each of a plurality of fiber optic inputs and an optical multiplexer associated with each of a plurality of programmable fiber optic outputs. A programmable resonator filter is associated with each of a plurality of programmed light wavelengths predesignated as channels for carrying digital signals for receiving light from the plurality of optical de-multiplexers and in optical communication with the programmably associated optical multiplexer. A first programmable superprism is associated with each of the light wavelengths predesignated as channels for carrying analog signals receiving the associated light wavelength from the plurality of optical de-multiplexers and directs the associated light wavelength as programmed. A second programmable superprism is programmably associated with each first programmable superprism and located for receiving the directed light wavelength and redirecting the directed light to the programmably associated optical multiplexer.

In a preferred embodiment, the instant invention presents a photonic integrated circuit approach to chip scale WDM enabled by a process to model, fabricate, and integrate III-V on Silicon, silicon-on-insulator (SOI), and electro-optic polymer technology. A voltage applied to a suitably oriented electro-optic polymer changes the wavelength dispersion or resonance filter wavelength of the SOI superprism or resonator filter. This leads to compelling wavelength selective devices that are rapidly reconfigurable wavelength selective crossconnects for routers. The high power analog signals are routed by super-dispersive elements at 1.55 μm and tunable filter resonators rout lower power digital signals. The resulting tunable wavelength selective cross-connect elements lead to a wafer scale router capable of routing the wavelength channels of analog data at 1.55 μm and the wavelength channels of digital data at 1.3 μm. Thus, the router matches the wavelength band labeled analog and digital data with the power, size, and wavelength characteristics of the nanophotonic routing device on the chip uniquely tailored to route either high power analog WDM signals or lower power WDM digital data links.

Because of the scale and the programmable nature of the router, it could be economically be substituted as either a multiplexer or de-multiplexer as well, thereby allowing a smaller inventory to service an existing network.

According to an aspect of the invention, reversible optical paths are provided thereby allowing efficient upstream and downstream routing, broadcast and mixing modes.

BRIEF DESCRIPTION OF THE DRAWINGS

The preferred and alternative embodiments of the present invention are described in detail below with reference to the following drawings.

DETAILED DESCRIPTION OF THE INVENTION

A mixed analog and digital chip-scale wavelength selective router includes an optical de-multiplexer associated with each of a plurality of fiber optic inputs and an optical multiplexer associated with each of a plurality of programmable fiber optic outputs. A programmable resonator is associated with each of a plurality of programmed light wavelengths predesignated as channels for carrying digital signals for receiving light from the plurality of optical de-multiplexers and in optical communication with the programmably associated optical multiplexer. A first programmable superprism is associated with each of the light wavelengths predesignated as channels for carrying analog signals receiving the associated light wavelength from the plurality of optical de-multiplexers and directs it as programmed. A second programmable superprism is programmably associated with each first programmable superprism and located for receiving the directed light wavelength and redirecting to the programmably associated optical multiplexer.

Figure 1:
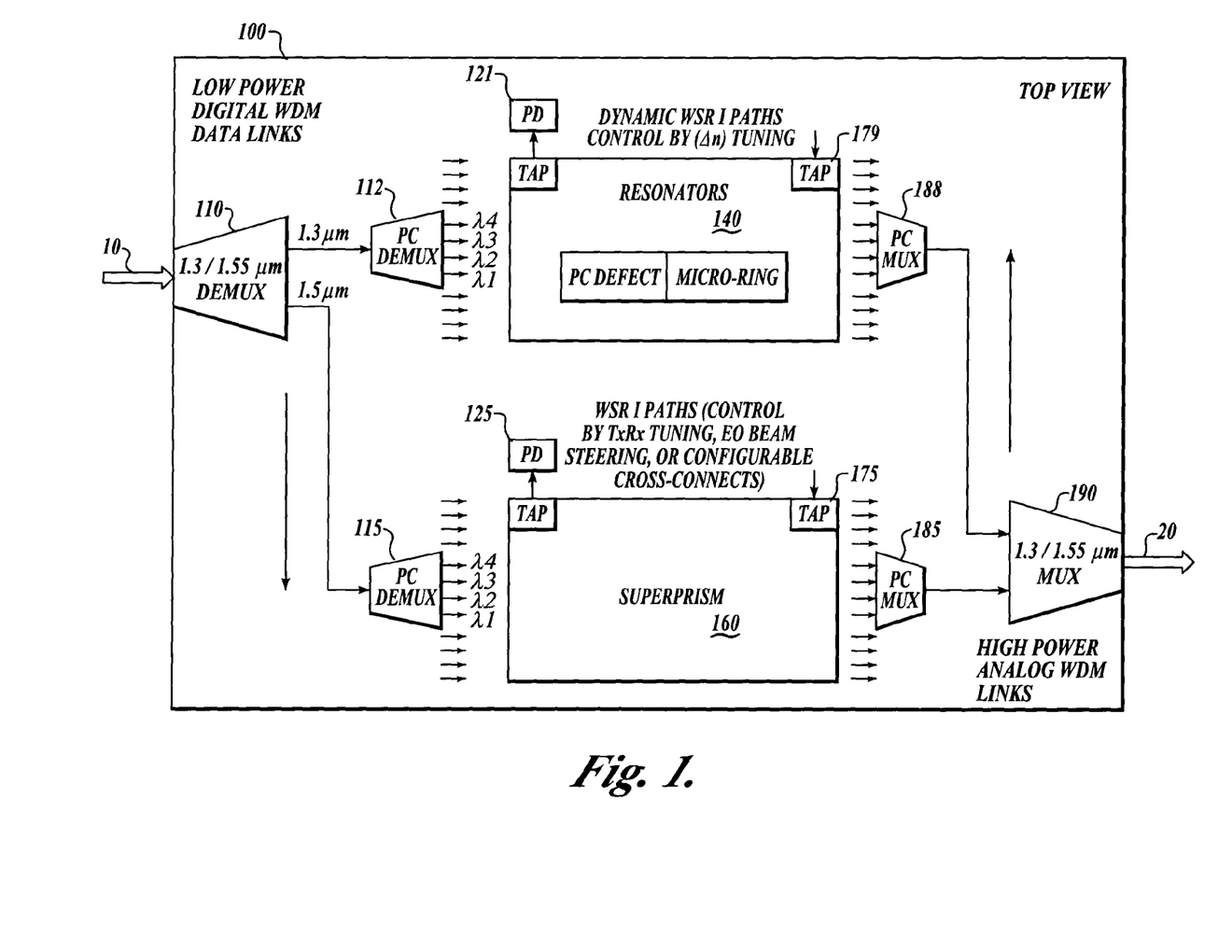
FIG. 1 is a schematic diagram of chip according to an embodiment of the present invention.

FIG. 1 presents an overview of the inventive router on its native chip 100. Shown is one of a plurality of inputs 10 attached to the inbound optical fibers from various sources. Also portrayed are the plurality of outputs 20 arranged to send outbound optical signals along optical fibers to their respective systems. There is no reason why the number of inputs and the number of outputs must necessarily correspond. One skilled in the art will readily appreciate that the variety and locations of sensors and enunciators might easily define several input areas for which separate fibers might suitably serve. On the other hand, the number of systems or destinations for the information will dictate the number of output channels.

Each of the inputs 10 is fed into a superprism de-multiplexer 110 in order to split generally higher power analog signals from generally lower power digital signals. The reason for de-multiplexing the digital signals from the analog signals is to protect the integrity of the chip 100 while assuring maximum fidelity for each type of signal. To make analog signals readily susceptible to de-multiplexing from the band of digital signals, by convention according to an embodiment of the invention, each type of signal is assigned to one of two bands defined by base wavelengths: about 1.55 µm for analog signals and about 1.3 µm for digital signals. However, it will be appreciated that other bands are possible and consistent with this invention.

Once the analog and digital signals are separated at each input de-multiplexer 110, the digital signals from each input de-multiplexer 110 are fed to a superprism digital signal de-multiplexer 112, thereby further splitting the digital signal into constituent channels. Again, convention may define the several channels within the digital band. For example in one embodiment, one present convention defines 32 channels within each band. As distinct channels, the output of the digital signal de-multiplexer 112 is fed into a digital resonator 140 for routing according to wavelength. A digital health monitor tap 121 and a digital signal injection tap 179 communicate with the digital resonator 140.

The output of the digital resonator 140 is the light output of all of the inputs 10 and routed according to wavelength and programmable electronic inputs (not shown). Each wavelength is collected by a superprism digital signal multiplexer 188. From the superprism digital signal multiplexer 188, the optical information is remultiplexed with analog output by an output signal multiplexer 190 corresponding to its output 20.

Like the digital band, the analog band is de-multiplexed according to wavelength at an analog signal de-multiplexer 115. The output of each analog signal de-multiplexer is a series of discrete channels. Rather than a resonator, the output at each input de-multiplexer 110 is fed into a beam steering device 160 to handle the greater power of the analog signals. Like those of the digital resonator 140, two taps communicate with the analog beam steering device 160, the analog health monitor tap 125 and the analog signal injection tap 175.

The output of the analog beam steering device 160 is fed into a superprism analog signal multiplexer 185. The multiplexer 185 is selected according to the wavelength of the analog signal and the programmed steering of the beam. From the analog signal multiplexer 185, the signal joins a digital signal at the output signal multiplexer 190 corresponding to the output port 20.

The de-multiplexing and the multiplexing tasks are all carried out on the chip 100, by passive optical elements. Each of the de-multiplexers, 110, 112, and 115, and each of the multiplexers, 185, 188, and 190 are passive superprisms, and carry out their tasks according to refractive indices and geometric placement. Configuration and manipulation of constituent elements of the superprisms and computer aided placement (known as "Wavelength scalable Finite Difference Time Domain (FDTD) optical modeling") will assist in precise element design, placement and interworking of these elements.

Figure 2:
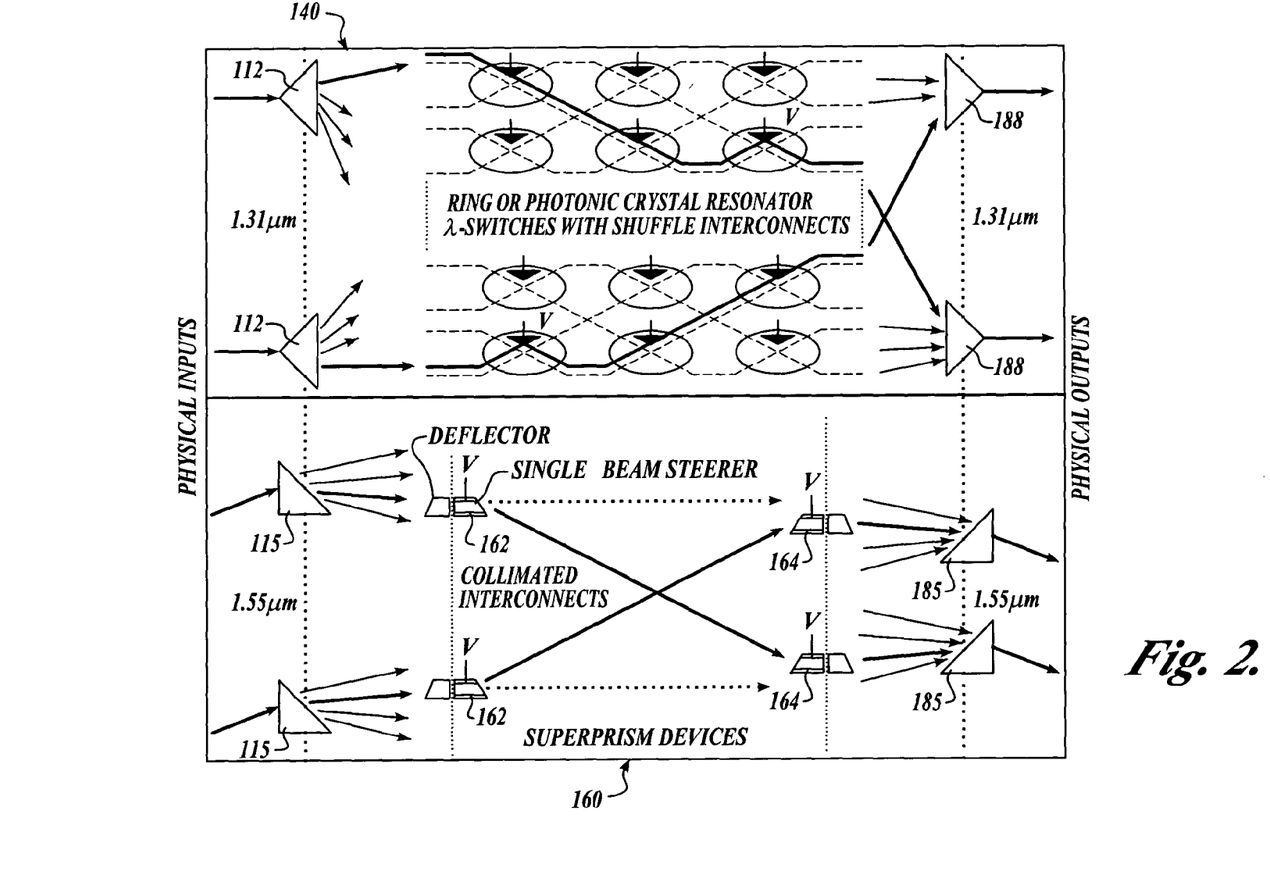
FIG. 2 is a schematic diagram contrasting the analog and digital sections of the router.

Referring now to FIG. 2, elements of the chip 100 that are responsive to programming are the digital resonator 140 and the analog beam steering device 160. The digital resonator 140 and the analog beam steering device 160, each executes similar functions but is distinctly driven according to the power levels entailed for signal fidelity. Both beam steering and programmable resonator filters have shown greater levels of tolerance for shock and heat because their construction has improved the quality of the response and the durability of these optical components. For this reason, it is not necessarily the case that while operating at distinct wavelengths, the two chambers must be distinctly driven. For example, the chip 100 with two beam steering devices for both analog and digital signals may include two resonators as described. By configuring the chip 100 with both technologies in a presently preferred embodiment, both are enabled.

The digital resonator 140 relies upon resonators to sort wavelengths. Once light of an appropriate wavelength is captured in the resonator, waveguides usher the light to its prescribed output from the resonator 140. One presently preferred embodiment employs micro-resonators in the form of rings, disks, or photonic crystals as the building blocks that provide the key functions of wavelength filtering and routing. In practical systems, it is advantageous to make these resonators active or programmable in order to correct for minor process or design imperfections and to allow control of the resonator characteristics. In one presently preferred embodiment, this control is acheived through either tuning Q of a III-V compound semiconductor resonator (or resonance tuning of an SOI resonator) by altering optical loss (or gain) within the resonator (or tuning its resonance wavelength by changing the refractive index of the ring or photonic crystal element to change the effective cavity length of the resonator). In a micro-ring resonator, a compound semiconductor structure containing an optically active layer is grown on top of the passive ring waveguide. The evanescent optical field of the ring waveguide overlaps the active layer allowing interaction with the resonant optical mode via photon absorption or emission. The amount of loss (or gain) in the resonator, and therefore its Q as well, is then determined by the number of photons coupled into or out of the resonant mode via the active layer. External control of the active layer emission is achieved through electrical biasing of a p-n junction (forming a light emitting diode), or by optical pumping at an absorptive wavelength sufficiently removed from the signal channels. The physical configuration of these micro-resonators is more fully discussed in conjunction with FIG. 5 below.

Another presently preferred method of forming resonators on the chip scale exploits the same technology of photonic crystals as is used to create the superprisms. Optically thin dielectric slabs, in which a fully etched-through two-dimensional patterning is applied, are used to form high-Q optical cavities with modal volumes approaching the theoretical limit of a cubic half-wavelength. Resonant cavities are formed from local defect regions within the photonic lattice. Heat can tune the resonant cavities. If the dielectric has been suitably doped with electo-optical polymers, the resonant cavities can be tuned by electric fields suitably adjusting the refractive index of the dielectric. This effect is further discussed in conjunction with FIGS. 4a and 4b below.

Employing either micro-ring resonators or photonic crystals, the passive de-multiplexers 112 convey the distinct wavelengths of optical signals into the resonator 140. Each resonator is programmed to capture only photons of a programmed wavelength. Other wavelength photons pass through moving from one resonator to the next in a path known as a "shuttle interconnect." The resonators act as small "whispering galleries" by capturing only photons of the programmed wavelength from the inbound light signals. Resonators collect the information the photons carry and then conduct the photons. By means of waveguides out of the resonator 140 to the programmed output point at the corresponding digital signal multiplexer 188. Where each of the designated channels for conveying information has a programmed resonator, the incoming signals should be appropriately routed, leaving no remaining ambient light energy.

The analog beam steering device 160 has a distinct strategy for programmable routing. Rather than resonant cavities, the beam steering device 160 exploits programmable superprisms as "pitchers" and "catchers." Just as the digital resonator 140 receives the distinct wavelength beams of light at distinct spots from passive de-multiplexers 112, the analog beam steering device 160 similarly receives the beams from the passive de-multiplexers 115. At each of the designated reception ports, an active or semi-active deflector 162 receives the beam. In the analogy to a pitcher, the deflector stands ready to direct the beam at a programmed point. The deflector 162 suitably is a photonic crystal or a pair of photonic crystals where at least one crystal is active. The pitcher deflector 162 is programmed to aim at one of several "catcher" deflectors 164. Like the pitcher deflector 162 from which it receives the beam, the "catcher" deflector 164 is programmed to appropriately face the "pitcher" reflector 162, and to relay the beam to the programmed analog signal multiplexer 185 corresponding with the programmed output port. The pitcher reflectors 162 are programmed as to which catcher deflectors 164 to choose while the catchers deflectors 164 are simultaneously programmed to face the pitcher reflectors 162 and to relay to the multiplexer 185. Because the beams pass one to the other without interference, the signal safely reaches its programmed output multiplexer 185.

The deflectors, 162 and 164, are suitably superprisms capable of steering beams. The simplest means of programming the pitching reflectors 162 and the catching deflectors 164, is to heat the superprism, thereby changing its dimensions. While effective, heating may be less predictable without a cooling airflow. For this reason, electro-optic polymers have been used to programmably steer the beams. One of the simplest alternate approaches for using electro-optic organic molecules within photonic crystals includes filling voids in holes that define the photonic crystals. Altering the refractive index of the polymer either optically or electrostatically indirectly tunes the effective cavity length. This effect can be used to modulate an incident light beam. Even more efficient electro-optic switching is expected if the nanocavity design is optimized to include a void at the center of the cavity to place the back-filled electro-optic polymer within the field maximum of the optical standing wave.

Another opportunity for inclusion of electro-optic molecules within photonic crystals relies on tuning the dispersive performance of photonic bandgaps. The relatively flat band structure exhibited by photonic crystals in certain directions leads to a large density of states and results in lensing and superprism effects. These effects can lead to electro-optically controlled or steered collimated beams that will serve as wavelength selective beam steerers.

Chip scale steering is enabled by the use of III-V on Silicon, silicon-on-insulator (SOI), and electro-optic polymer technology into compelling wavelength selective devices that enable rapidly reconfigurable wavelength selective routers. Devices that in one embodiment may entail III-V gain or electro-optic polymers for use in wavelength selective routers include: (1) electrically pumped photonic crystal micro resonator lasers or gain elements with similar lithographic control and electro-optic polymer tuning; (2) electrically pumped ring or micro disk lasers whose output wavelength is controllable via lithography and potentially tunable through the use of an electro-optic polymer; (3) resonant defect coupled photonic crystal waveguides, also using electo-optic tuning for wavelength routing; and (4) coupling structures that enable the upper layer III-V devices to couple down to the silicon waveguides in the SOI interconnect layer.

Figure 3:
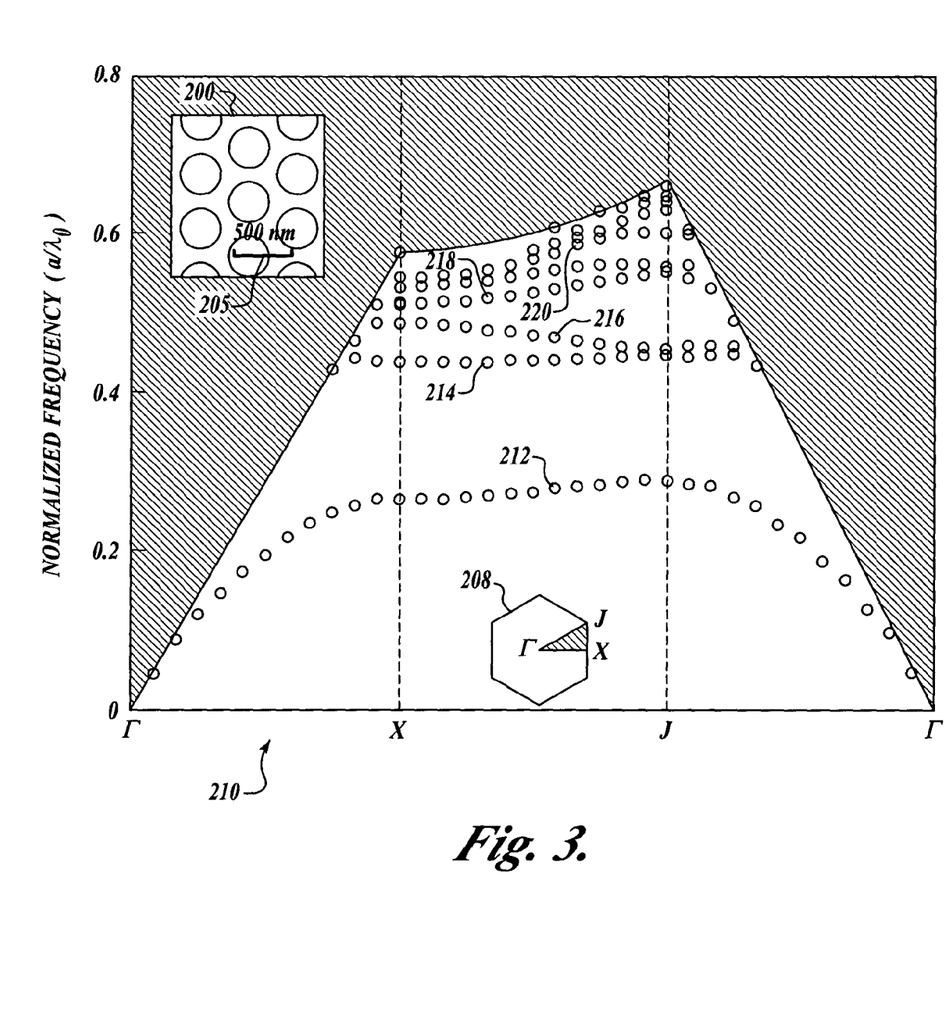
FIG. 3 is a band energy graph indicating the energy as a function of the geometry of the superprism.

Referring now to FIG. 3, a large bandgap is associated with a triangular superprism 200. This geometry is more completely described in the diagram showing the significant dimensions 208. The abscissa of the normalized frequency graph includes these dimensions 210. This geometry owes its performance to a high degree of symmetry and will focus light.

The unique properties of a square geometry differ greatly from a triangular geometry in that there exists a dimension along the diagonal distinct from the lateral dimension. The bandgap becomes very narrow. The conduction band is very flat. Iso-frequency contours are square allowing the light to collimated. This is the geometry of a photonic crystal resonator. In short, photons of these wavelengths pass through the square lattice. But, light of the appropriate bandgap will collimate, resulting in a photonic crystal resonator.

Figure 4A:
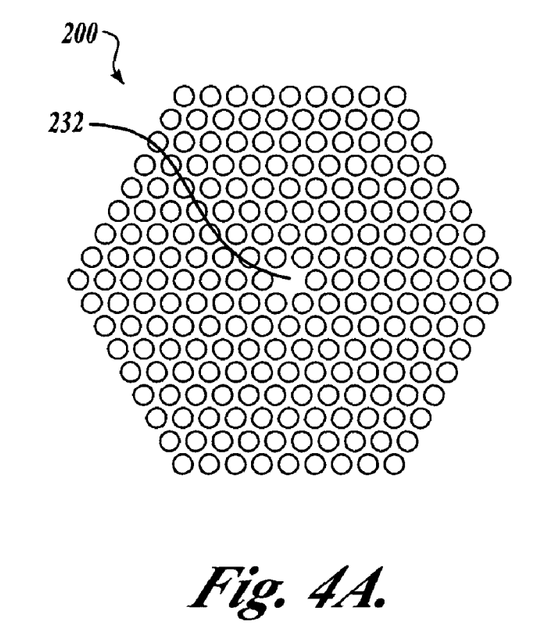
FIG. 4a is a photomicrograph of a placed defect in the superprism causing resonance.

Referring now to FIG. 4a, a defect 232 is placed in the triangular geometry of a superprism 200 generates similar effects. Rather than the regular repetition of the triangular lattice, the expected hole at 232 is absent, hence the defect. Two effects take over. Total internal reflection and Bragg diffraction, i.e. constructive multiple-beam interference in the periodic structure which can expel light from the material for certain frequencies and directions of incidence are the base phenomenon for photonic crystals.

Figure 4B:
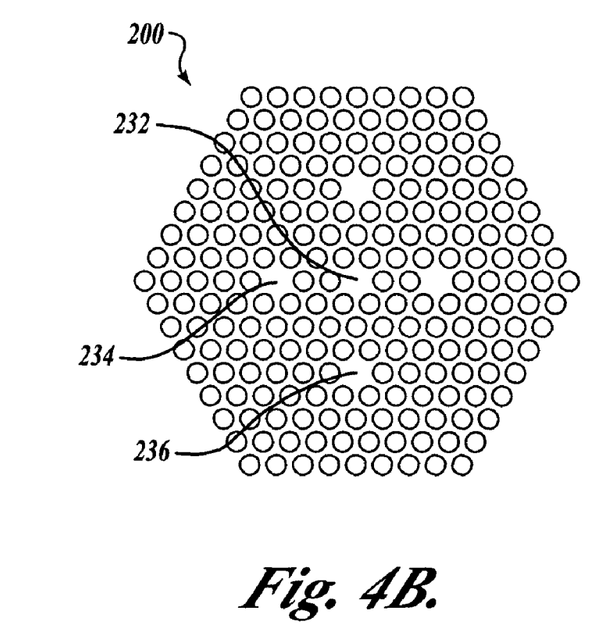
FIG. 4b is a photomicrograph of a series of placed defects in the superprism causing resonance.

Referring not now to FIG. 4b, to enhance the effect, additional defects are inserted, e.g. 234 and 236, to act as photonic crystal mirrors.

Figure 5:
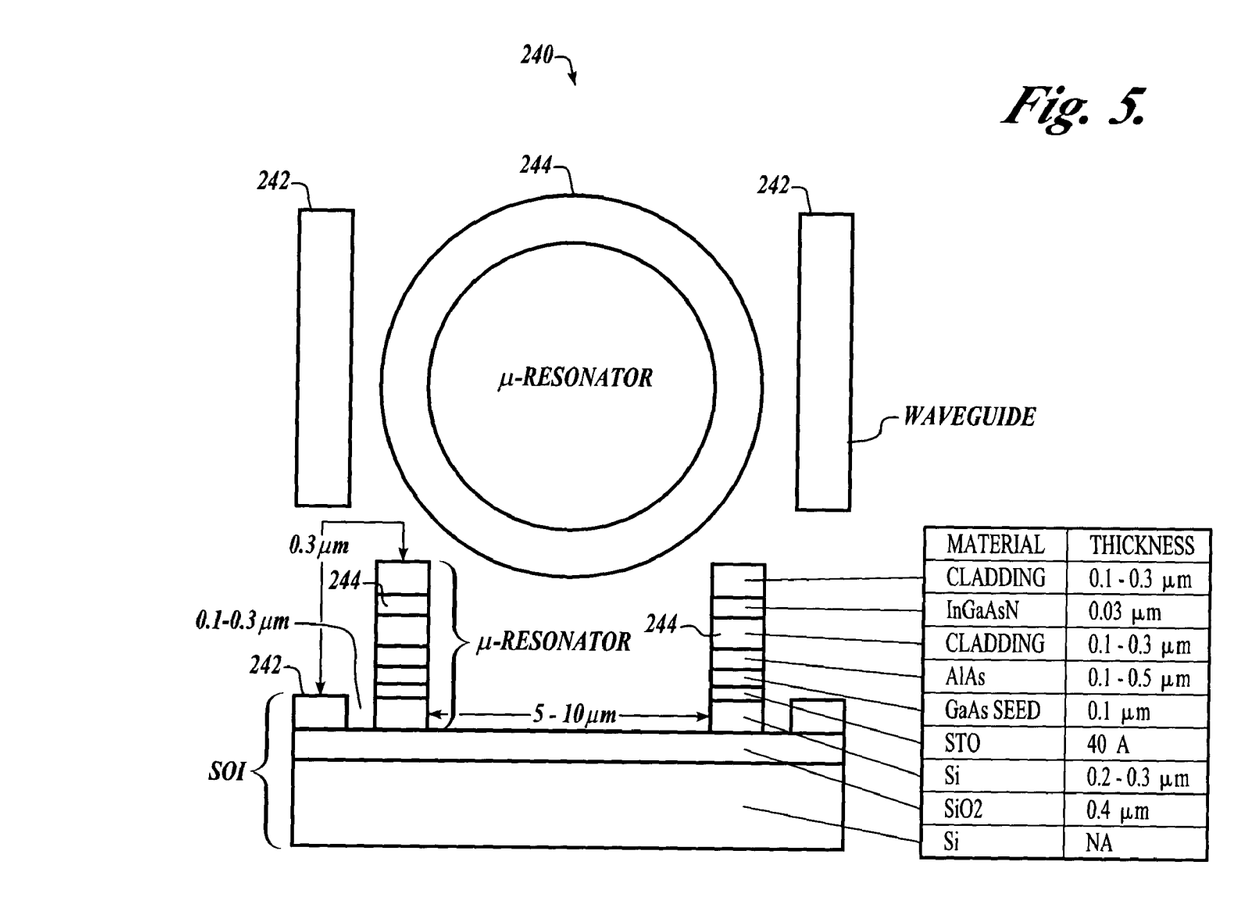
FIG. 5 is a schematic diagram showing the overhead and cutaway views of a programmable resonator.
Figure 6:
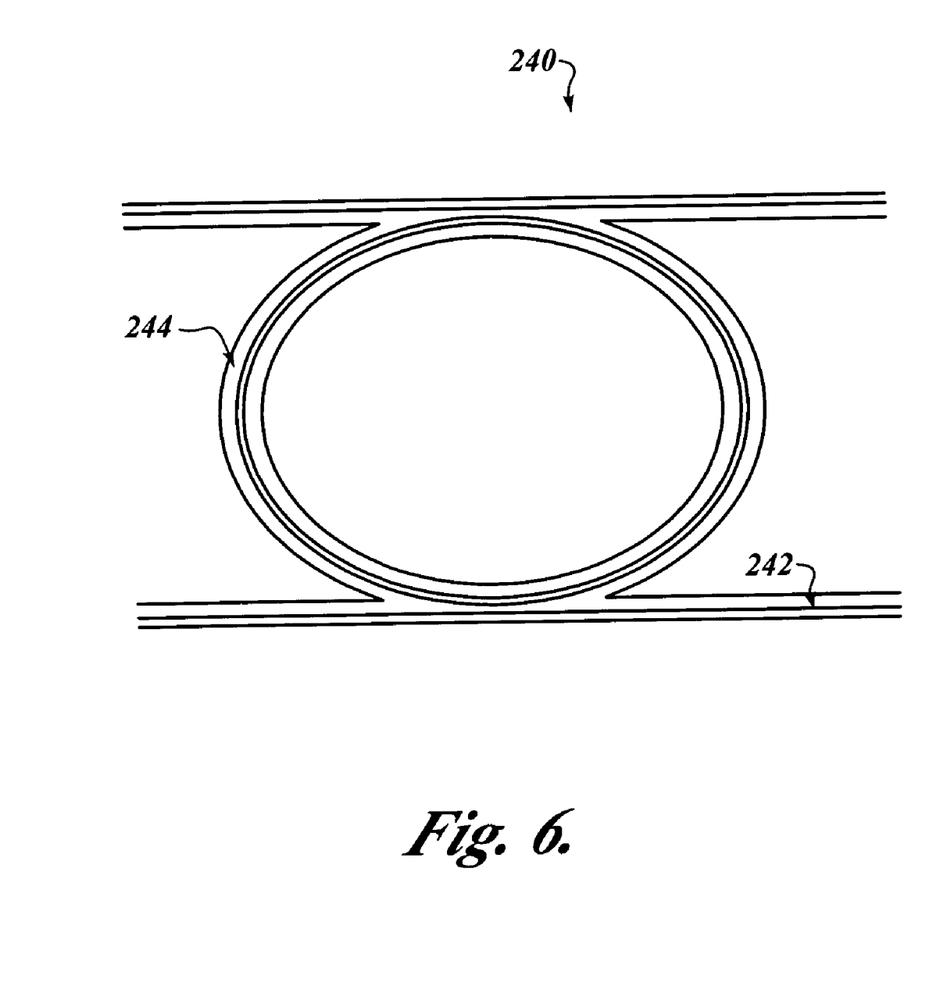
FIG. 6 is a photomicrograph of a programmable resonator.

Referring now to FIGS. 5 and 6, construction of a microresonator 240 is explained. A compound semiconductor structure containing an optically active layer is grown on top of the passive ring waveguide as illustrated in FIG. 5. The evanescent optical field of the ring waveguide overlaps the active layer allowing interaction with the resonant optical mode via photon absorption or emission. The amount of loss (or gain) in the resonator, and therefore its Q as well, is then determined by the number of photons coupled into or out of the resonant mode via the active layer. External control of the active layer emission is achieved through electrical biasing of a p-n junction (forming a light emitting diode), or by optical pumping at an absorptive wavelength sufficiently removed from the signal channels.

One presently preferred structure for the micro-resonator 240 is an InGaAsN QW material structure on native substrates (GaAs). A cross section of the Ill-V material structure is shown in FIG. 6. A perovskite interfacial layer and thin Ill-V buffer layer are grown directly on the Si surface of the SOI wafer. A low refractive index optical isolation layer is grown next, followed by lower carrier confinement layers that sandwich an InGaAsN quantum well active layer. The optical isolation layer includes an oxidized high Al mole fraction AlGaAs layer as described below. The optical emitting structure may be undoped, if intended for optical pumping, or may contain a doped p-n junction forming an electrically pumped LED structure. In the latter case, an optional etch stop layer may be included within the lower confinement layer to assist in electrical contact formation.

The refractive index and thickness of layers between the passive Si waveguide 242 and the optically active layer of a Ill-V stack 244 are important design parameters of the resonator 240 as these factors largely determine the coupling between the two and the strength of the gain/loss control of the resonator 240. To provide optical and electrical isolation, it is desirable to have non-conductive, low refraction index material between these two regions. For this, a high Al mole fraction AlGaAs buffer layer is included above the heteroepitaxial interface layer (FIG. 5), then laterally oxidized once the resonator structure has been defined by etching. The resulting structure of the resonator 240 can be readily produced by current chip formulation techniques as demonstrated in the photomicrograph of FIG. 6. The same layering forms the waveguides 242 and the stack 244.

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. A WDM router comprising a chip, the chip including a wavelength filter resonator for changing paths of different wavelength channels of light, the resonator including at least one of tunable wavelength filter photonic crystal resonator components and tunable wavelength filter ring resonator components; wherein the router receives an optical input including wavelength bands of lower power WDM signals and wavelength bands of higher power WDM signals; wherein the router further comprises components for separating the lower power WDM signals from the higher power WDM signals; and wherein the lower power signals are supplied to the wavelength filter resonator.

2. The WDM router of claim 1, wherein the resonator includes tunable wavelength filter ring resonator components.

3. The WDM router of claim 2, wherein the wavelength filter ring resonator components are wavelength tunable by changing the resonator's index to change effective cavity length.

4. The WDM router of claim 2, wherein the wavelength filter ring resonator components are EO voltage index tunable.

5. The WDM router of claim 2, wherein the wavelength filter ring resonator components are Q-tunable by altering optical loss within the resonator.

6. The WDM router of claim 5, wherein the wavelength filter resonator components include a Q-tunable optically active layer on top of a passive ring waveguide.

7. The WDM router of claim 1, wherein the resonator includes tunable wavelength filter photonic crystal resonator components.

8. The WDM router of claim 7, wherein the resonator components include a tunable wavelength filter photonic crystal; wherein the photonic crystal includes defects made of electro-optic polymers; and wherein index of refraction of a defect is changed by subjecting the electro-optical polymer to an electrical voltage, whereby the wavelength filter resonator is dynamically programmable.

9. The WDM router of claim 8, wherein the wavelength filter resonator includes a photonic crystal resonator having tuned wavelength filter resonant cavities in optically thin slabs.

10. The WDM router of claim 7, wherein the wavelength filter photonic crystal resonator components are wavelength tunable by changing index of photonic crystal defect to change effective cavity length.

11. The WDM router of claim 1, wherein the chip further includes a device for cross-connecting selected wavelength to selected outputs.

12. The WDM router of claim 1, wherein the components for separating the lower power WDM signals from the higher power WDM signals include a tunable photonic crystal superprism.

13. The WDM router of claim 1, further comprising a demultiplexer for splitting the lower power signal into constituent channels, the constituent channels being supplied to the wavelength filter resonator.

14. A WDM router comprising a chip, the chip including a tunable photonic crystal superprism for changing propagation directions of different wavelengths of collimated rays of light; wherein the superprism receives an optical input including wavelength bands of lower power WDM signals and wavelength bands of higher power WDM signals and separates the lower power WDM signals from the higher power WDM signals.

15. The WDM router of claim 14, wherein the superprism includes programmable interfaces.

16. The WDM router of claim 14, wherein the superprism includes a photonic crystal having defects made of electro-optic polymers; and wherein the index of refraction of a defect is changed by subjecting the electro-optical polymer to an electrical voltage, whereby the superprism is dynamically programmable.

17. The WDM router of claim 14, wherein the superprism includes a photonic crystal that is wavelength tunable by changing index of photonic crystal defect to change effective cavity length.

18. The WDM router of claim 14, wherein the superprism receives an optical input and separates the input into constituent channels.

* * * * *